United States Patent [19]
Dohjo et al.

[11] Patent Number: 5,646,756
[45] Date of Patent: Jul. 8, 1997

[54] LIQUID CRYSTAL DISPLAY DEVICE WITH A PROTECTING FILM THAT PARTIALLY OVERLAPS A DISPLAY PIXEL ELECTRODE

[75] Inventors: Masayuki Dohjo, Yokohama; Akira Kubo, Himeji; Yasuharu Tanaka, Yokohama; Katsuhiko Inada, Himeji, all of Japan

[73] Assignee: Kabushiki Kaisha Toshiba, Kawasaki, Japan

[21] Appl. No.: 527,938

[22] Filed: Sep. 14, 1995

[30] Foreign Application Priority Data

Sep. 16, 1994 [JP] Japan .................................. 6-222284

[51] Int. Cl.$^6$ .................................................. G02F 1/1343
[52] U.S. Cl. .................................................. 349/42; 349/122
[58] Field of Search .................................. 359/59, 54, 74

[56] References Cited

U.S. PATENT DOCUMENTS

| | | | |
|---|---|---|---|
| 4,759,610 | 7/1988 | Yanagisawa | 359/67 |
| 5,066,110 | 11/1991 | Mizushima et al. | 359/54 |
| 5,084,905 | 1/1992 | Sasaki et al. | 359/59 |

FOREIGN PATENT DOCUMENTS

| | | | |
|---|---|---|---|
| 0086349 | 8/1983 | European Pat. Off. | 359/59 |
| 62-265629 | 11/1987 | Japan | 359/59 |
| 2-151835 | 6/1990 | Japan | 359/59 |
| 6-43487 | 2/1994 | Japan | 359/59 |
| 6-82830 | 3/1994 | Japan | 359/54 |

Primary Examiner—William L. Sikes
Assistant Examiner—James A. Dudek
Attorney, Agent, or Firm—Cushman, Darby & Cushman, IP Group of Pillsbury Madison & Sutro LLP

[57] ABSTRACT

A liquid crystal display device having an array substrate. The substrate has: (1) an insulating transparent substrate that has a pixel region and a non-pixel region, (2) a plurality of thin film transistors disposed in a matrix pattern on a display screen, each thin film transistor having a gate insulating film that is produced by an atmosphere pressure chemical vapor deposition; (3) a plurality of display pixel electrodes formed on the pixel region of the insulating transparent substrate, each display pixel electrode being connected to each of the thin film transistors; and (4) a protecting film formed on the non-pixel region of the insulating transparent substrate, the protecting film extends from the non-pixel region and overlaps a peripheral portion of each of the display pixel electrodes that are disposed in a portion of the display screen by a width of 2 µm to 7 µm. The display also has a counter substrate that is disposed apart from and facing the array substrate. A sealant layer is disposed at peripheries of the array substrate and the counter substrate so as to seal a space between the array substrate and the counter substrate and is provided with a liquid crystal-inlet port. A liquid crystal layer fills in a space between the array substrate and the counter substrate. The liquid crystal layer being injected in the space from the liquid crystal-inlet port. A closing layer is used to close the liquid crystal-inlet port.

13 Claims, 5 Drawing Sheets

LIQUID CRYSTAL DISPLAY DEVICE WITH A PROTECTING FILM THAT PARTIALLY OVERLAPS A DISPLAY PIXEL ELECTRODE

BACKGROUND OF THE INVENTION

1. Field of the Invention

This invention relates to a liquid crystal display device, and in particular to a liquid crystal display device that is capable of preventing the deterioration of image quality due to the on-current decrease of a thin film transistor.

2. Description of the Related Art

Recently, a liquid crystal display device has been extensively utilized as a flat type display device. In particular, an active matrix type liquid crystal display device has attracted attention among various type of liquid crystal display devices because this active matrix type liquid crystal display device is exceptionally excellent in contrast ratio and also in response speed as compared with other types of liquid display device.

Figure 1:
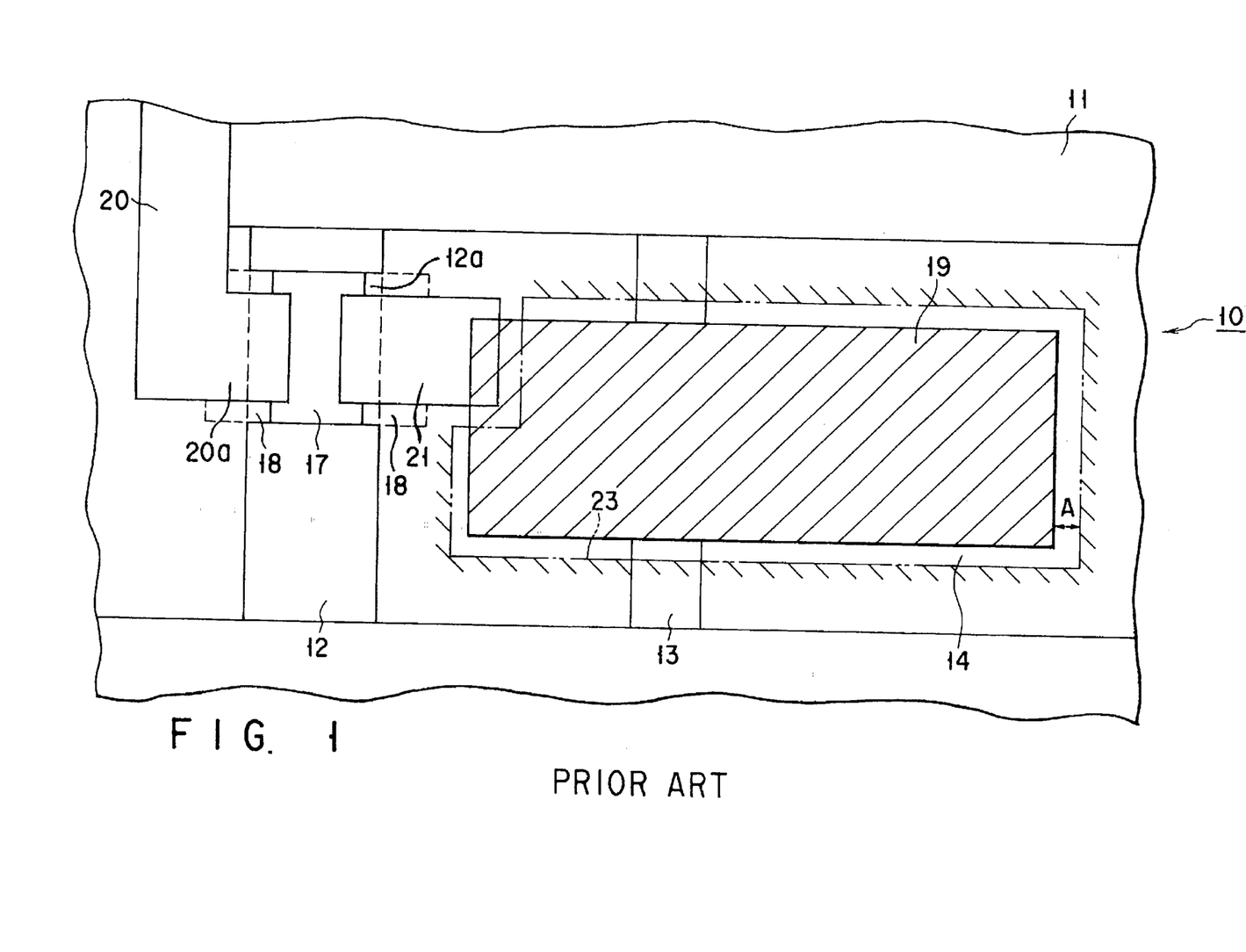
FIG. 1 is a plan view schematically illustrating an example of the conventional liquid crystal display device.

FIG. 1 shows a plan view of a typical example of the conventional active matrix type liquid crystal display device, which will be explained as follows.

Referring to FIG. 1, an array substrate 10 comprises a glass substrate 11 constituting an insulating transparent substrate. On this glass substrate 11 is formed a predetermined pattern of a conductive film made of molybdenum-tantalum (MoTa) alloy. This conductive film pattern is composed of an address line 12 including a gate electrode 12a, and an storage capacity electrode 13. On this glass substrate 11 comprising the address line 12, including the gate electrode 12a, and the storage capacity electrode 13 is formed a first gate insulating film consisting of silicon oxide (SiOx) formed by means of the atmosphere pressure CVD (Chemical Vapor Deposition) method.

On a portion of this first gate insulating film, which corresponds to where the gate electrode 12a is located, the following are superimposed by means of a plasma CVD method: a laminated pattern of a second gate insulating film consisting of silicon nitride (SiNx), a first semiconductor layer consisting of an amorphous silicon (a-Si) film and an etching stopper layer 17 functioning as a protecting film. Further, over the first semiconductor layer and the etching stopper 17 is formed a second semiconductor layer 18 consisting of a low resistance amorphous silicon (n$^+$ a-Si).

Further, on another portion of the first gate insulating film 14, which corresponds to where the gate electrode 12a is not located, a pattern of display pixel electrode 19 is superimposed, by means of a sputtering method.

On the second semiconductor layer 18 is formed, through the sputtering of aluminum, patterns of signal line 20 functioning also as a source electrode 20a and of a drain electrode 21, one end of which is connected to the display pixel electrode 19, thereby constituting a thin film transistor.

Over this thin film transistor is formed a pattern of a passivation or protecting film 23 covering the thin film transistor as well as the portions around the display pixel electrode 19 with a space A being interposed between the circumference of the display pixel electrode 19 and the brim of the pattern of the passivation film 23 surrounding the display pixel electrode 19. Further, an alignment film is formed on passivation film 23.

Meanwhile, a counter substrate (not shown) is disposed facing the array substrate 10 which is explained above. This counter substrate comprises a glass substrate constituting an insulating transparent substrate. On a surface portion of this glass substrate is formed a pattern of color filters comprising red (R), green (G) and blue (B), each being formed on a portion corresponding to where the display pixel electrode 19 is formed. On the spaces between the neighboring color filters is formed a lattice-like pattern of black matrix so as to be disposed over the thin transistor. Further, on these color filters and black matrix is formed a counter electrode consisting of ITO on which an alignment film is formed.

On the outer surfaces of the glass substrate 11 of the array substrate 10 and of the glass substrate 31 of the counter substrate, which are opposite to the inner surfaces thereof and face each other, are formed polarizing plates respectively.

Figure 2:
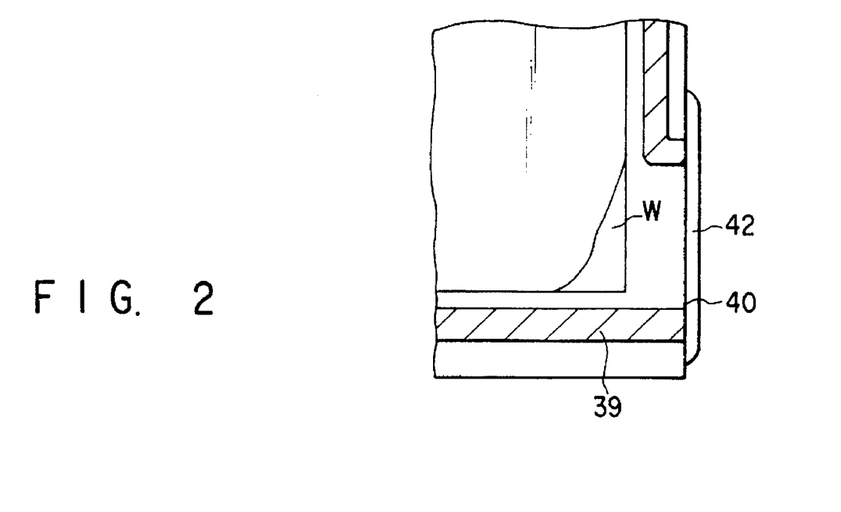
FIG. 2 is an enlarged plan view of a portion near the liquid crystal inlet port of the conventional liquid crystal display device, schematically illustrating a deteriorated state of image quality.

Between the array substrate 10 and the counter substrate is disposed a spacer which keeps the array substrate 10 spaced apart by a predetermined distance from the counter substrate. The peripheral portion of the space between the array substrate 10 and the counter substrate is sealed with a sealing agent 39 comprising, for example, epoxy resin. An opening is formed as shown in FIG. 2 at a portion of this sealing agent 39 thereby constituting an inlet port 40 for a liquid crystal. A liquid crystal 41 is filled through this inlet port 40 in the space between the array substrate 10 and the counter substrate. This inlet port 40 is also closed with a closing agent 42 comprising for example acrylic resin.

In this array substrate 10 of the conventional type, a space is formed between the display pixel electrode 19 and the protecting film 23 as shown in FIG. 1 so as to prevent the protecting film 23 from being overlapped by the display pixel electrode 19 in order to keep constant the voltage to be applied to the liquid crystal over the display pixel electrode 19 and to enlarge the aperture ratio of the display pixel electrode 19 as much as possible. Specifically, a groove-like space A is formed between the display pixel electrode 19 and the protecting film 23 in a manner to entirely surround the display pixel electrode 19, thus exposing through this space A a first gate insulating film 14.

This first gate insulating film 14, however, is vulnerable to the penetration of impurity ions and poor in moisture resistance so that impurity ions such as sodium (Na) generated from the glass substrate 11, for example, may be penetrated from this exposed portion A of the first gate insulating film 14 into the first gate insulating film 14. Similarly, water may enter through the liquid crystal inlet port 40, which is closed with the closing agent 42, or through the sealant 39 and may penetrate into the first gate insulating film 14. These impurity ions and water that has penetrated into the first gate insulating film 14, or even water originally included in the first gate insulating film 14, are more likely to be transferred into the thin film transistor, thereby inviting the deterioration in performance of the thin film transistor as well as the deterioration with time of the write performance due to the poor transistor, and thus giving rise to the problem of deteriorating image quality.

Figure 3:
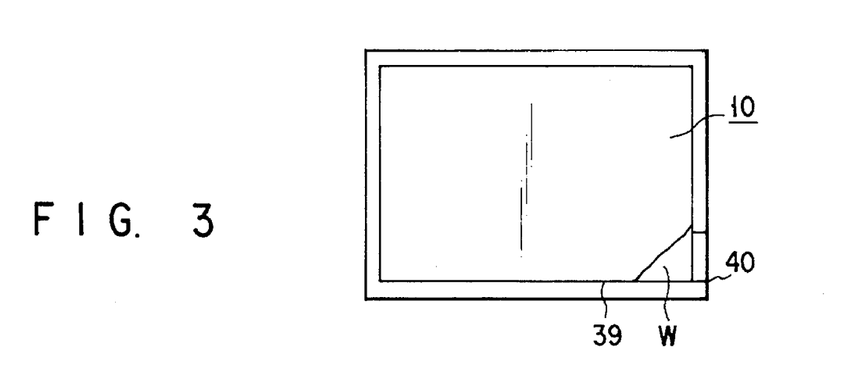
FIG. 3 is a plan view of a portion near the liquid crystal inlet port of the conventional liquid crystal display device, schematically illustrating a deteriorated state of image quality.
Figure 4:
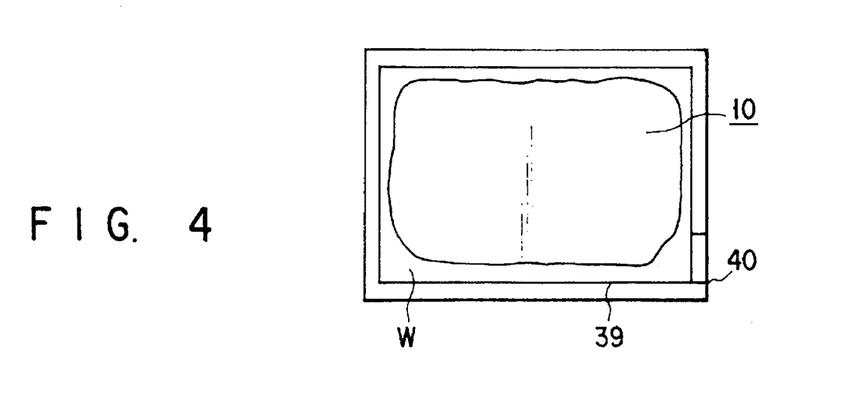
FIG. 4 is a plan view of a peripheral portion around the sealant layer of the conventional liquid crystal display device, schematically illustrating a deteriorated state of image quality.

This deterioration of image quality—for example, a non-black portion is developed even if a signal to display a black image is given to the entire image screen in the normally white mode—occurs, in the initial stage, at the region within a radius of about 3 cm around the liquid crystal inlet port 40 as indicated by W in FIG. 3. This deteriorated portion W expands with time to the periphery of the sealing agent 42 as indicated in FIG. 4, thereby causing the deterioration of image visibility.

Therefore, there has been a strong demand to develop a liquid crystal display device which is free from the problems as explained above and capable of improving the reliability, and can be manufactured without necessitating an increase of patterning steps and with an excellent alignment.

SUMMARY OF THE INVENTION

Therefore, an object of this invention is to provide a liquid crystal display device that is capable of avoiding deterioration of image quality and can be manufactured without accompanying any troublesome manufacturing steps.

Namely, according to the present invention, there is provided a liquid crystal display device comprising;

an array substrate including an insulating transparent substrate that has a pixel and a non-pixel region, a plurality of thin film transistors disposed in a matrix pattern all over a display screen, a plurality of display pixel electrodes formed on said pixel region of said insulating transparent substrate, each connected to each of said thin film transistor, a protecting film formed on a non-pixel region of said insulating transparent substrate, said protecting film extending from said non-pixel region and overlapping a periphery of each of said display pixel electrodes disposed at least in a portion of said display screen;

a counter substrate disposed spaced apart from and facing to said array substrate;

a sealant layer disposed at peripheries of said array substrate and said counter substrate to seal a space between said array substrate and said counter substrate and provided with a liquid crystal-inlet port;

a liquid crystal layer filled in a space between said array substrate and said counter substrate, said liquid crystal being injected in said space from said liquid crystal-inlet port; and a closing layer for closing said liquid crystal-inlet port.

This invention further provides a liquid crystal display device comprising;

an array substrate including an insulating transparent substrate that has a pixel and a non-pixel region, a plurality of thin film transistors disposed in a matrix pattern all over a display screen, a plurality of display pixel electrodes formed on said pixel region of said insulating transparent substrate, each connected to each of said thin film transistor, a protecting film formed on said pixel region of said insulating transparent substrate;

a counter substrate disposed spaced apart from and facing to said array substrate;

a sealant layer disposed at peripheries of said array substrate and said counter substrate to seal a space between said array substrate and said counter substrate and provided with a liquid crystal-inlet port;

a liquid crystal layer filled in a space between said array substrate and said counter substrate, said liquid crystal being injected in said space from said liquid crystal-inlet port; and a closing layer for closing said liquid crystal-inlet port;

wherein said thin film transistor comprises; a gate electrode formed on said insulating transparent substrate, a gate insulating film formed on said insulating transparent substrate provided with said gate electrode, a semiconductor layer formed on a portion of said gate insulating film which corresponds to where said gate electrode is located, and drain and source electrodes formed on said semiconductor layer; and said protecting film is formed on a non-pixel region where said display pixel electrodes are not located on said insulating transparent substrate, said protecting film extending from said non-pixel region and overlapping a periphery of each of said display pixel electrodes disposed at least in a portion of said display screen.

Additionally, this invention provides a liquid crystal display device comprising;

an array substrate including an insulating transparent substrate that has a pixel and a non-pixel region, a plurality of thin film transistors disposed in a matrix pattern all over a display screen, a plurality of display pixel electrodes formed on said pixel region said insulating transparent substrate, each connected to each of said thin film transistor, a protecting film formed on said non-pixel region said insulating transparent substrate;

a counter substrate disposed spaced apart from and facing to said array substrate;

a sealant layer disposed at peripheries of said array substrate and said counter substrate to seal a space between said array substrate and said counter substrate and provided with a liquid crystal-inlet port;

a liquid crystal layer filled in a space between said array substrate and said counter substrate, said liquid crystal being injected in said space from said liquid crystal-inlet port; and a closing layer for closing said liquid crystal-inlet port;

wherein said protecting film is formed on a non-pixel region where said display pixel electrodes are not located on said insulating transparent substrate, said protecting film extending from said non-pixel region and overlapping a periphery of each of said display pixel electrodes disposed at least in a portion of said display screen.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

This invention will be further explained with reference to the following preferred embodiments.

The features of the liquid crystal display device of this invention reside in that the pattern of the protective film extends from the non-pixel electrodes in such a manner as to cover not only a non-pixel region where said display pixel electrodes are not located, but also the periphery of the each of display pixel electrodes. With this construction, it is possible to prevent water entering through a sealant or a closing agent from penetrating into a thin film transistor from a gate insulating film. Therefore, it is possible to prevent the deterioration with time of write performance of the thin film transistor and to prevent the deterioration of image quality without causing the structure to become complicated.

It is possible to prevent a deterioration of image quality of the portion which is most vulnerable to deterioration by forming a protecting film in such a manner as to overlap peripheral portions of the display pixel electrodes that are located at the region of display image screen near the liquid crystal inlet port, since as shown in FIG. 3, the portion of image screen that is most vulnerable to deterioration of image quality is the region near the liquid crystal inlet port of a display image screen. At the same time, it is also possible to prevent lowering of the aperture ratio of the display pixel electrode, i.e. the lowering of brightness by forming the protecting film in such a manner as not to overlap the peripheral portion of the display pixel electrode excluding the portion near the liquid crystal inlet port.

In this case, since the region within a radius of at least 3 cm around the liquid crystal inlet port is most vulnerable to the deterioration of image quality, it is preferable to form the protecting film in such a manner as to overlap the peripheral portions of the display pixel electrodes which are located within a radius of at least 3 cm around the liquid crystal inlet port.

Further, it is possible to prevent a deterioration of image quality of the portion which is vulnerable to deterioration by forming a protecting film in such a manner as to overlap peripheral portions of the display pixel electrodes along the sealant and the closing agent, since the region of display image screen along the sealant and the closing agent are also vulnerable to the deterioration of image quality. At the same time, it is also possible to prevent lowering of the aperture ratio of the display pixel electrode, i.e. the lowering of brightness by forming the protecting film in such a manner as not to overlap the peripheral portion of the display pixel electrode excluding the portion along the sealant and the closing agent.

In this case, the region of display image screen along the sealant and the closing agent may be defined to mean a region of 1 to 3 cm in width along the sealant and the closing agent.

If the protecting film is to be formed in a manner to overlap the periphery of the display pixel electrodes formed all over the display image screen, the patterning of the protecting film can be performed using the same mask all over the display image screen in the patterning process thereby making it possible to simplify the manufacturing process.

The overlapping width of the protecting film over the periphery of the display pixel electrode should preferably be 2 μm to 7 μm. If this overlapping width of the protecting film is less than 2 μm, the overlapping may be lost at some portion due to the alignment error of patterning, whereas if this overlapping width of the protecting film is more than 7 μm, it may cause the lowering of the aperture ratio of the display pixel electrode.

One example of a liquid crystal display device according to this invention will be explained with reference to drawings as follows. In the following examples, the same parts are referred to by the same reference numerals as that used in FIG. 1.

Figure 5:
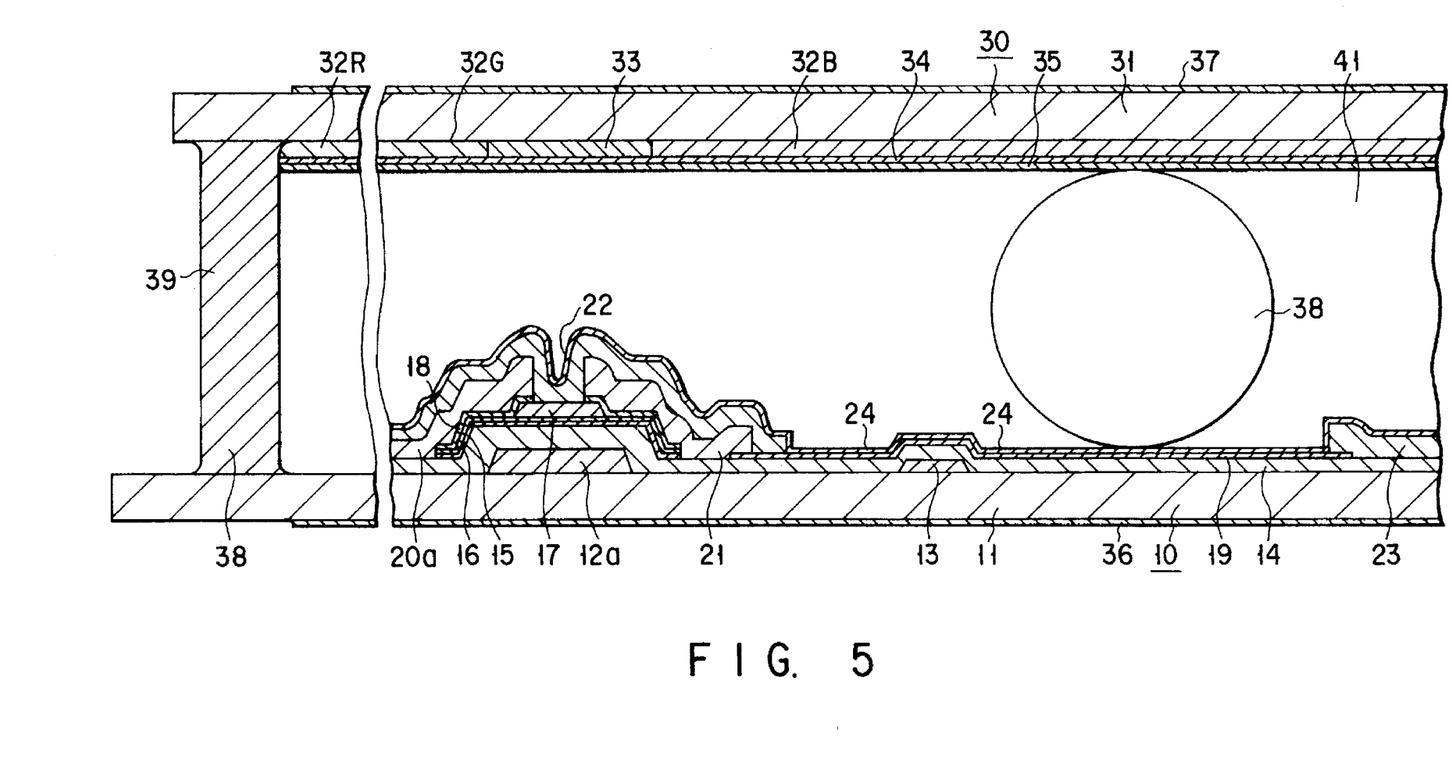
FIG. 5 is a sectional view schematically showing a liquid crystal display device according to this invention.
Figure 6:
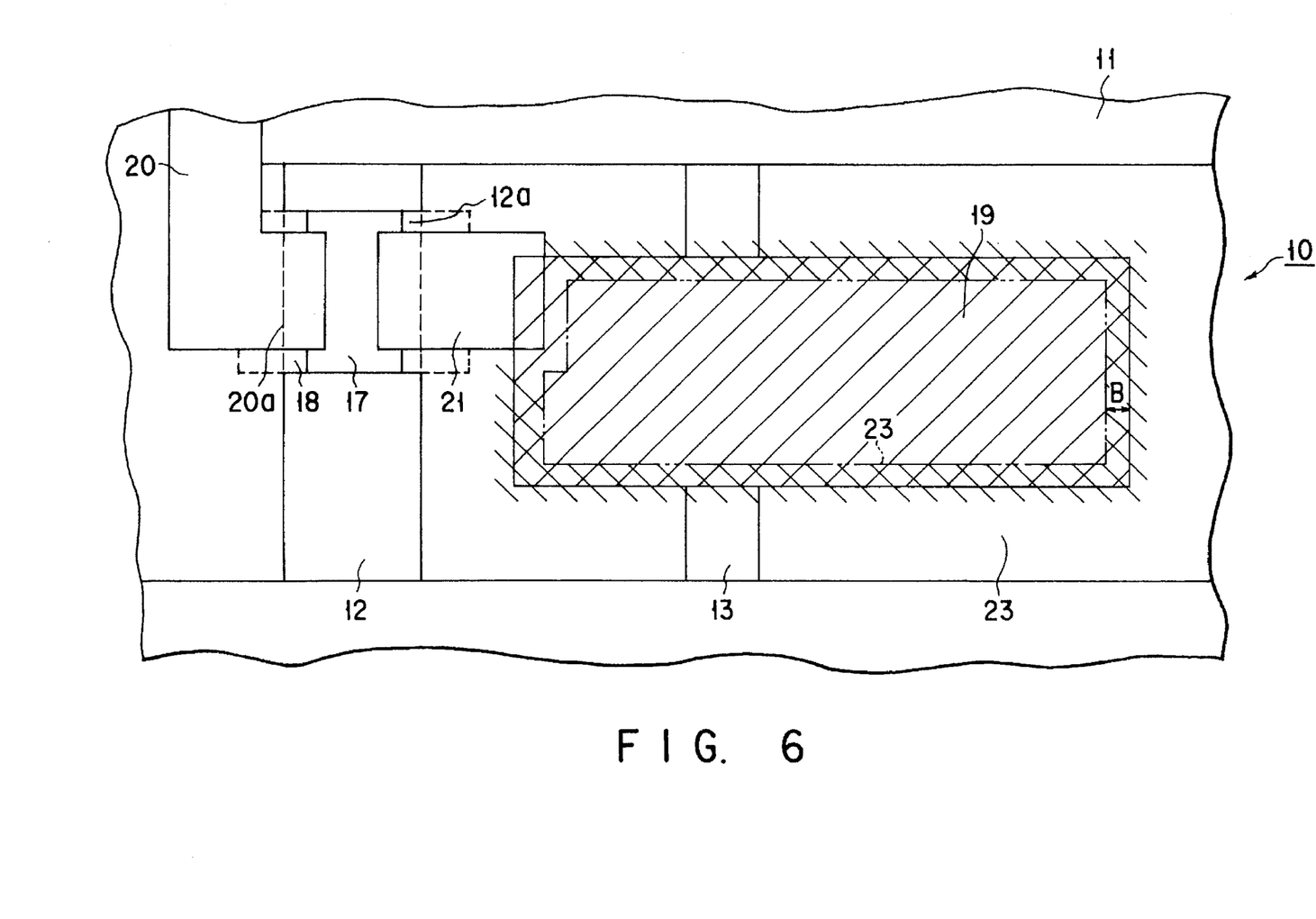
FIG. 6 is a plan view of a liquid crystal display device according to this invention.

As shown in FIGS. 5 and 6, the array substrate 10 comprises a glass substrate 11 constituting an insulating transparent substrate. On this glass substrate 11 is formed a predetermined pattern of a conductive film made of molybdenum-tantalum (MoTa) alloy. This conductive film pattern is composed of an address line 12, including a gate electrode 12a, and an storage capacity electrode 13. On this glass substrate 11 comprising the address line 12, including the gate electrode 12a, and the storage capacity electrode 13 is formed a first gate insulating film consisting of silicon oxide (SiOx) formed by means of a atmosphere pressure CVD (Chemical Vapor Deposition) method.

On a portion of the first gate insulating film, which corresponds to where the gate electrode 12a is located, the following are superimposed by means of a plasma CVD method: a laminated patterns of a second gate insulating film 15 consisting of silicon nitride (SiNx), a first semiconductor layer consisting of an amorphous silicon (a-Si) film, and an etching stopper layer 17 functioning as a protecting film. Further, over the first semiconductor layer and the etching stopper 17 is formed a second semiconductor layer 18 consisting of a low resistance amorphous silicon ($n^+$ a-Si).

Further, on another portion of the first gate insulating film 14, which corresponds to where the gate electrode 12a is not located, a pattern of display pixel electrode 19 is superimposed, by means of a sputtering method.

On the second semiconductor layer 18 is formed, through the sputtering of aluminum, patterns of signal line 20 functioning also as a source electrode 20a and of a drain electrode 21, one end of which is connected to the display pixel electrode 19, thereby constituting a thin film transistor 22 disposed in a matrix pattern.

Over this thin film transistor 22 is formed a pattern of passivation or protecting film 23. This pattern of passivation film 23 is formed in such a manner as to overlap the periphery of the display pixel electrode 19 by the width B of 3 μm. Further, an alignment film 24 is formed respectively on this passivation film 23 and the display pixel electrode 19.

Meanwhile, a counter substrate 30 is disposed facing the array substrate 10, which is explained above. This counter substrate 30 comprises a glass substrate 31 constituting an insulating transparent substrate. On a surface portion of this glass substrate 31 is formed a pattern of color filters 32R, 32G and 32B, each being formed on a portion corresponding to the display pixel electrode 19 and constituting red (R), green (G) and blue (B) respectively. On the spaces between the neighboring color filters 32R, 32G and 32B is formed a lattice-like pattern of black matrix 33 so as to be disposed over the thin transistor 22. Further, on these color filters 32R, 32G and 32B and black matrix 33 is formed a counter electrode 34 consisting of ITO on which an alignment film 35 is formed.

On the outer surfaces of the glass substrate 11 of the array substrate 10 and of the glass substrate 31 of the counter substrate 30 which are opposite to the inner surfaces thereof and face each other are formed polarizing plates 36 and 37 respectively.

Between the array substrate 10 and the counter substrate 30 is disposed a spacer 38 which keeps the array substrate 10 spaced apart by a predetermined distance from the counter substrate 30. The peripheral portion of the space between the glass substrate 11 of the array substrate 10 and the glass substrate 31 of the counter substrate 30 is sealed with a sealing agent 39 comprising, for example, epoxy resin. An opening 5 μm in height and 18 mm in width is formed as shown in FIG. 2 at a portion of this sealing agent 39 thereby constituting an inlet port 40 for a liquid crystal. A liquid crystal 41 is filled through this inlet port 40 in the space between the array substrate 10 and the counter substrate 30. This inlet port 40 is closed with a closing agent 42 comprising for example acrylic resin. In this manner, a 13.8 inch diagonal liquid crystal display device can be formed.

Next, the method of manufacturing the liquid crystal display device having the above structure will be explained below.

First, a conductive film made of molybdenum-tantalum (MoTa) alloy and having a predetermined thickness is formed on the surface of the glass substrate 11 of array substrate 10 and then subjected to patterning to obtain an address line 12 functioning also as a gate electrode 12.

Then, a first gate insulating film 14 consisting of silicon oxide (SiOx) is formed by means of an atmosphere pressure CVD (Chemical Vapor Deposition) method. This first gate insulating film 14 may be silicon oxide film having a thickness of 200 nm to 400 nm, which can be obtained by repeating the atmosphere pressure CVD process at least twice.

Subsequently, a silicon nitride (SiNx) film, an amorphous silicon (a-Si) film and an etching stopper layer 17 are successively deposited, and then, the etching stopper layer is patterned on a portion of the first semiconductor layer 16 that corresponds to where the gate electrode 12a is disposed. Further, a low resistance amorphous silicon ($n^+$ a-Si) is deposited thereover and patterned to form a second semiconductor layer 18 with the formation of a second insulating film 15 and a first semiconductor layer 16.

Subsequently, ITO is deposited by means of a sputtering method over the first gate insulating film 14 and patterned to form a display pixel electrode 19 over a portion of the first gate insulating film 14 where the gate electrode 12a is not located.

The deposition of aluminum is performed by means of sputtering, which is then patterned to form a signal line 20 functioning also as a source electrode 20a and a drain electrode 21 thereby forming a thin film transistor 22.

Then, a pattern of passivation film 23 is formed in such a manner as to cover the thin film transistor 22 and to overlap the peripheral portion, excluding the display portion, of the display pixel electrode 19. Specifically, as shown in FIG. 1, the passivation film 23 is formed in such a manner that the passivation film 23 overlaps the peripheral portion of the display pixel electrode 19 by the width B (FIG. 6) measuring 3 μm without causing the first gate insulating film 14 to be exposed through the groove-like space A as in the conventional device.

On the other hand, patterns of color filters 32R, 32G and 32B and black matrix 33 are formed on the glass substrate 31, and then a counter electrodes 34 consisting of ITO are superimposed on these color filters 32R, 32G and 32B as well as on the black matrix 33.

Subsequently, the array substrate 10 and the counter substrate 30 are washed, and after the formation respectively of the alignment films 34 and 35 on the array substrate 10 and counter substrate 30, the aligning treatment is performed on the alignment films 34 and 35.

Thereafter, the peripheral portion of the array substrate 10, excluding the portion where the inlet port 40 is to be formed, is coated by means of printing with a sealing agent 39, and after a plurality of spacers 38 are intermittently disposed in the region encircled by the sealing agent 39, the counter substrate 30 is superimposed on the array substrate 10 aligning with each other. After being superimposed in this manner, the peripheral portions of the array substrate 10 and the counter substrate 30 are sealed with the sealing agent 39.

The composite of the array substrate 10 and counter substrate 30, sealed with the sealing agent 39, is then cut into a predetermined size, for example cut into four sections, and then a predetermined amount of liquid crystal 41 is injected through each inlet port 40 into the space between the array substrate 10 and the counter substrate 30. After finishing the injecting of the liquid crystal 41, the inlet port 40 is closed with a closing agent 42, and then polarizing plates 36 and 37 are mounted respectively on the outer surfaces of the array substrate 10 and the counter substrate 30 which are opposite to the inner facing surfaces thereof, thereby completing the manufacture of the liquid crystal display device.

Next, the operation of the liquid crystal display device explained above will be discussed as follows.

When this liquid crystal display device is to be actuated, a voltage is successively applied, as in the ordinary liquid crystal display device, to the signal lines 20 of the thin film transistors 22 disposed in a matrix pattern, thereby successively feeding scanning signals to the address lines 12 of the thin film transistors 22, which are connected to the signal lines 20 that are supplied with this voltage. As a result, the thin film transistors 22 whose signal lines 20 and address lines 12 are applied with the voltage are actuated or turned to ON, and a voltage is generated between the display pixel electrode 19 that is connected to the drain electrode 21 of this turned-on thin film transistor and the counter electrode 34 of the counter substrate 30, thereby actuating the liquid crystal 41.

In the above embodiment, the overlapping width between the protecting film 23 and the display pixel electrode 19 is selected to be 3 μm. However, it is also possible to obtain a satisfactory result if the overlapping width is within the range of 2 μm to 7 μm. Namely, in view of the alignment error of a photoresist pattern exposing machine for forming a pattern, an overlapping width of at least 2 μm is required. On the other hand, in view of enlarging aperture ratio of the display pixel electrode as much as possible, as well as taking into consideration the registration margin in relative to the edge of the black matrix disposed on the counter substrate 30, the maximum allowable overlapping width is 7 μm. Therefore, the overlapping width of the protecting film over the periphery of the display pixel electrode 19 should preferably be 2 μm to 7 μm.

When the protecting film 23 is caused to overlap the periphery of the display pixel electrode 19 in this manner, a possibility of the space A being formed between the peripheral portion of the display pixel electrode 19 and the protecting film 23 as explained in the explanation of the prior art in reference with FIG. 1 can be avoided, and the first gate insulating film 14 can be completely covered by the display pixel electrode 19 and/or the protecting film 23. Accordingly, even if water enters through the sealant 39 or from the inlet port 40 through a closing agent 42, it is least probable that the water thus entered or even impurity ions from a glass substrate could penetrate into the first gate insulating film 14. Therefore, there is no possibility of causing the lowering of performance such as the deterioration of image quality due to a partial failure of the switching-on of the thin film transistor 22, results from a decrease of the on-current of the thin film transistor 22 due to the lowering or direction shift of threshold voltage.

Since the structure of liquid crystal display device of this invention is substantially the same as that of the conventional liquid crystal display device except that the protecting film 23 partially overlaps the peripheral portion of the display pixel electrode 19, the liquid crystal display device of this invention can be manufactured without necessitating the formation of any additional layer or causing the manufacturing process to become complicated.

Figure 7:
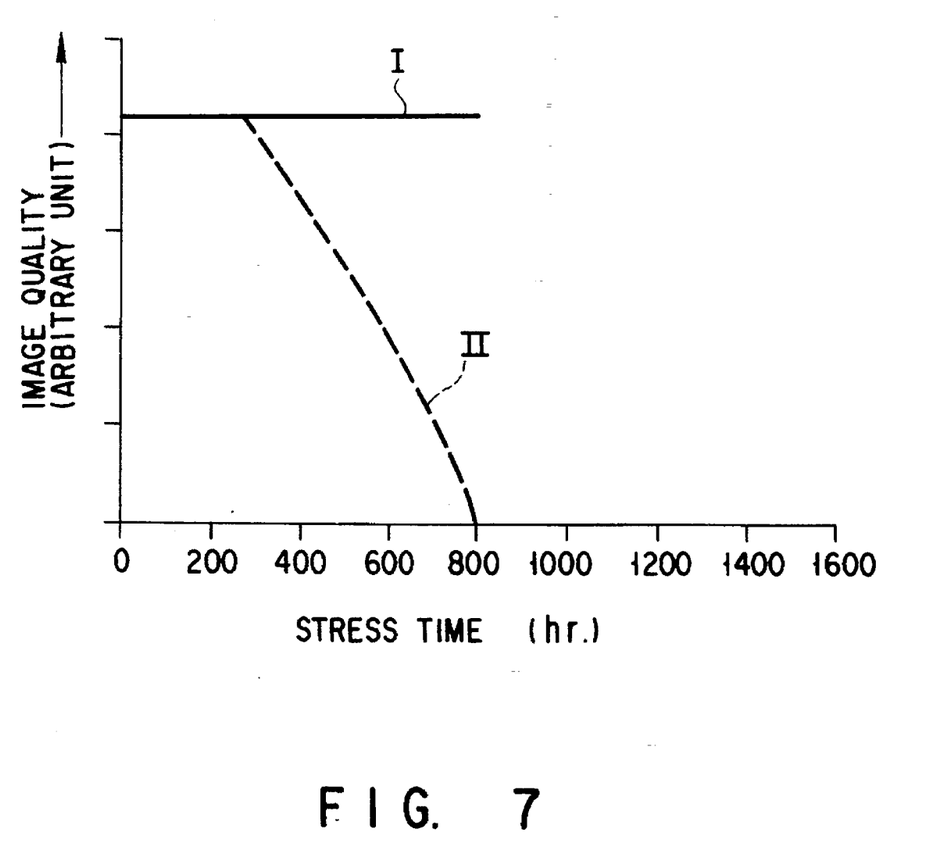
FIG. 7 is a graph showing a relationship between a stress time and image quality.

It has been confirmed from the experiments conducted by the present inventors that, as far as the central portion of the image screen is concerned, there is no substantial difference in image quality admitted in a stress test as shown by a solid line I in FIG. 7 between the structure of the conventional device and the structure where the periphery of the display pixel electrode 19 was overlapped by the protecting film 23. However, in the vicinity of the inlet port 40, when the conventional liquid crystal display device is actuated under a stressed conditions of 50° C. and 80% humidity, the deterioration of image quality was recognized after 400 hours of testing and the deterioration of image quality was fairly propagated after 800 hours of testing as indicated by the dotted line II.

Whereas, in the case of the structure where the periphery of the display pixel electrode 19 was overlapped by the protecting film 23, the change in image quality indicated almost the same tendency as that of the solid line I even in the vicinity of the inlet port 40, demonstrating that the deterioration of image quality can be effectively inhibited, thereby making it possible to expand the life of the device. By the way, if the periphery of the display pixel electrode 19 is not overlapped by the protecting film 23, but simply contacted with the periphery of the protecting film 23, it is hardly possible to achieve such prominent effects as explained above.

In the above embodiment, the peripheral portions of the display pixel electrodes 19 are entirely overlapped by the protecting film 23 throughout the image screen, but this invention is not limited to such an embodiment. Namely, it is also possible according to this invention to restrict such an overlapped portion to only portions of the display pixel electrodes 19 around the inlet port 40, in particular portions of the display pixel electrodes 19 that are located within a radius of at least 3 cm around the liquid crystal inlet port 40, leaving other peripheral portions of the display pixel electrode 19 kept apart from the protecting film 23 by the width of A as shown in FIG. 1 illustrating the conventional device. With this structure, it is possible to prevent the development of deterioration of image quality of the peripheral portions of the display pixel electrodes 19 around the inlet port 40, which are most vulnerable to image deterioration, and at the same time to prevent the lowering of aperture ratio of the display pixel electrode 19 because such an overlapped portion is not formed in the peripheral portion other than around the inlet port 40.

It is also possible according to this invention to restrict such an overlapped portion to only portions of the display pixel electrode 19 located along the sealant 39 and the closing agent 42, in particular the region 1 cm to 3 cm in width from the peripheral edge of display screen electrodes 19, leaving other portions of the display screen electrodes 19 kept apart from the passivation film 23 by the width of A as shown in FIG. 1 illustrating the conventional device. With this structure, it is possible to prevent the development of deterioration of image quality of the peripheral portions of the display pixel electrodes 19 along the sealant 39 and the closing agent 42, which is vulnerable to image deterioration, and at the same time to prevent the lowering of aperture ratio of the display pixel electrode 19 because of non-existence of the overlapped portion in other peripheral portions.

It is also possible according to this invention to restrict such an overlapped portion to portions of the display pixel electrodes 19 that are located within a radius of at least 3 cm around the liquid crystal inlet port 40 and to portions of the display pixel electrodes 19 located along the sealant 39 and the closing agent 42, in particular the region 1 cm to 3 cm in width from the sealant 39 and the closing agent 42 leaving other peripheral portions of the display screen electrodes 19 kept apart from the protecting film 23 as shown in FIG. 1. With this structure, it is possible to prevent the development of deterioration of image quality of the peripheral portions of the display pixel electrode 19 around the inlet port 40 and along the sealant 39 and the closing agent 42, which are vulnerable to image deterioration, and at the same time to prevent the lowering of aperture ratio of the display pixel electrode 19 because of non-existence of the overlapped portion in other peripheral portions.

The almost the same effects as explained above in relative to the embodiment where the black matrix 33 is formed on the counter substrate 30 can be attained even with a structure where the black matrix 33 is formed on the array substrate 10.

In the above embodiment, this invention is explained with reference to a thin film transistor of reverse stagger type. However, it is possible to attain the substantially the same effects even with a thin film transistor of normal stagger type. It is also possible to prevent the lowering of aperture ratio by varying the area of the display pixel electrode in the central portion of the image screen from that in the peripheral portion thereof.

As explained above, since the protecting film is formed to overlap the periphery of the display pixel electrode, even if water enters through the sealant or through the closing agent, it is possible to prevent the water thus entered from penetrating via the first gate insulating film into the thin film transistor. Therefore, it is possible to prevent the deterioration with time of write performance of the thin film transistor without causing the structure of the device to become complicated and to prevent the deterioration of image quality.

Further, it is possible to prevent a deterioration of image quality of the portion which is most vulnerable to deterioration by forming a protecting film in such a manner as to overlap peripheral portions of the display pixel electrodes in the vicinity of the liquid crystal inlet port, in particular a portions of the display pixel electrodes that located within a radius of at least 3 cm around the liquid crystal inlet port. At the same time, it is also possible to prevent lowering of the aperture ratio of the display pixel electrode, i.e. the lowering of brightness by forming the protecting film in such a manner as not to overlap the peripheral portions of the display pixel electrodes that are disposed in regions other than the vicinity of the liquid crystal inlet port.

Moreover, it is also possible to prevent a deterioration of image quality of the portion that is vulnerable to deterioration by forming a protecting film in such a manner as to overlap peripheral portions of the display pixel electrodes disposed along the sealant layer and the closing agent layer. At the same time, it is also possible to prevent lowering of the aperture ratio of the display pixel electrode, i.e. the lowering of brightness by forming the protecting film in such a manner as not to overlap the peripheral portions of the display pixel electrodes that are disposed in regions other than along the sealant layer and the closing agent layer.

If the protecting film is to be formed in a manner to overlap the periphery of the display pixel electrodes formed all over the display image screen, the patterning of the protecting film can be performed using the same mask all over the display image screen in the previous patterning process, thereby making it possible to simplify the manufacturing process.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A liquid crystal display device comprising:
   an array substrate including:
   an insulating transparent substrate that has a pixel region and a non-pixel region,
   a plurality of thin film transistors disposed in a matrix pattern on a display screen, each thin film transistor having a gate insulating film that is produced by an atmosphere pressure chemical vapor deposition,
   a plurality of display pixel electrodes formed on said pixel region of said insulating transparent substrate, each display pixel electrode being connected to each of said thin film transistors, and
   a protecting film formed on said non-pixel region of said insulating transparent substrate, said protecting film extends from said non-pixel region and overlaps a peripheral portion of each of said display pixel electrodes that are disposed in a portion of said display screen by a width of 2 μm to 7 μm;
   a counter substrate disposed apart from and facing said array substrate;
   a sealant layer disposed at peripheries of said array substrate and said counter substrate to seal a space between said array substrate and said counter substrate and having a liquid crystal-inlet port;
   a liquid crystal layer filling in a space between said array substrate and said counter substrate, said liquid crystal layer being injected in said space from said liquid crystal-inlet port; and
   a closing layer for closing said liquid crystal-inlet port.

2. The liquid crystal display device according to claim 1, wherein said protecting film is formed in such a manner as to overlap peripheral portions of the display pixel electrodes disposed in the vicinity of the liquid crystal inlet port.

3. The liquid crystal display device according to claim 1, wherein said protecting film is formed in such a manner as to overlap peripheral portions of the display pixel electrodes located within a radius of at least 3 cm around the liquid crystal inlet port.

4. The liquid crystal display device according to claim 1, wherein said protecting film is formed in such a manner as to overlap peripheral portions of the display pixel electrodes disposed all over a display image screen.

5. A liquid crystal display device comprising an array substrate including:
   an insulating transparent substrate that has a pixel region and a non-pixel region,
   a plurality of thin film transistors disposed in a matrix pattern on a display screen,
   a plurality of display pixel electrodes formed on said pixel region of said insulating transparent substrate, each display pixel electrode being connected to each of said thin film transistors, and
   a protecting film formed on said non-pixel region of said insulating transparent substrate;
   a counter substrate disposed spaced from and facing said array substrate;
   a sealant layer disposed at peripheries of said array substrate and said counter substrate to seal a space between said array substrate and said counter substrate and having a liquid crystal-inlet port;
   a liquid crystal layer filling in a space between said array substrate and said counter substrate, said liquid crystal layer being injected in said space from said liquid crystal-inlet port; and
   a closing layer for closing said liquid crystal-inlet port;
   wherein said thin film transistor comprises:
   a gate electrode formed on said insulating transparent substrate,
   a gate insulating film formed by an atmosphere pressure chemical vapor deposition on said insulating transparent substrate that is provided with said gate electrode,
   a semiconductor layer formed on a portion of said gate insulating film that corresponds to where said gate electrode is located, and
   drain and source electrodes formed on said semiconductor layer; and
   wherein said protecting film extends from said non-pixel region and overlaps a peripheral portion of each of said display pixel electrodes that are disposed in a portion of said display screen by a width of 2 μm to 7 μm.

6. The liquid crystal display device according to claim 5, wherein said protecting film is formed in such a manner as to overlap peripheral portions of the display pixel electrodes disposed in the vicinity of the liquid crystal inlet port.

7. The liquid crystal display device according to claim 5, wherein said protecting film is formed in such a manner as to overlap peripheral portions of the display pixel electrodes located within a radius of at least 3 cm around the liquid crystal inlet port.

8. The liquid crystal display device according to claim 5, wherein said protecting film is formed in such a manner as to overlap peripheral portions of the display pixel electrodes disposed all over a display image screen.

9. The liquid crystal display device according to claim 5, wherein said gate insulating film comprises silicon oxide film which is formed by means of an atmosphere pressure CVD process to have a thickness of 200 nm to 400 nm by repeating the atmosphere pressure CVD method twice or more.

10. A liquid crystal display device comprising:
    an array substrate including:
    an insulating transparent substrate that has a pixel region and a non-pixel region,
    a plurality of thin film transistors disposed in a matrix pattern on a display screen, each thin film transistor having a gate insulating film produced by an atmosphere chemical vapor deposition,
    a plurality of display pixel electrodes formed on said pixel region of said insulating transparent substrate, each display pixel electrode being connected to each of said thin film transistors, and
    a protecting film formed on a non-pixel region of said insulating transparent substrate;

a counter substrate disposed apart from and facing said array substrate;

a sealant layer disposed at peripheries of said array substrate and said counter substrate to seal a space between said array substrate and said counter substrate and having a liquid crystal-inlet port;

a liquid crystal layer filling in a space between said array substrate and said counter substrate, said liquid crystal layer being injected in said space from said liquid crystal-inlet port; and a closing layer for closing said liquid crystal-inlet port;

wherein said protecting film extends from said non-pixel region and overlaps a peripheral portion of each of said display pixel electrodes that are disposed in a portion of said display screen by a width of 2 μm to 7 μm.

11. The liquid crystal display device according to claim 10, wherein said protecting film is formed in such a manner as to overlap peripheral portions of the display pixel electrodes disposed along said sealant layer and said closing agent layer by a width of 1 to 3 cm.

12. The liquid crystal display device according to claim 10, wherein said protecting film is formed in such a manner as to overlap peripheral portions of the display pixel electrodes disposed in the vicinity of said liquid crystal inlet port.

13. The liquid crystal display device according to claim 12, wherein said protecting film is formed in such a manner as to overlap a peripheral portion of the display pixel electrode located within a radius of at least 3 cm around the liquid crystal inlet port.

* * * * *